(12) United States Patent
Harris

(10) Patent No.: US 7,082,223 B1
(45) Date of Patent: Jul. 25, 2006

(54) REDUCING ALIASING ARTIFACTS WHEN SHAPING A DIGITAL IMAGE

(75) Inventor: Jerry Harris, Newberry, FL (US)

(73) Assignee: Adobe Systems Incorporated, San Jose, CA (US)

( * ) Notice: Subject to any disclaimer, the term of this patent is extended or adjusted under 35 U.S.C. 154(b) by 423 days.

(21) Appl. No.: 10/622,852

(22) Filed: Jul. 18, 2003

Related U.S. Application Data

(62) Division of application No. 09/514,748, filed on Feb. 28, 2000, now Pat. No. 6,865,301.

(51) Int. Cl.
G06K 9/40 (2006.01)
G06K 9/32 (2006.01)
G06T 13/00 (2006.01)

(52) U.S. Cl. ............... 382/264; 382/299; 345/473

(58) Field of Classification Search ........... 382/261, 382/276, 299, 300, 162, 167, 264; 345/418, 345/426, 473–474, 581
See application file for complete search history.

(56) References Cited

U.S. PATENT DOCUMENTS

| | | | | |
|---|---|---|---|---|
| 5,422,986 A * | 6/1995 | Neely | ................. | 345/426 |
| 5,432,898 A | 7/1995 | Curb et al. | | |
| 5,504,849 A | 4/1996 | Brusewitz | | |
| 5,506,693 A | 4/1996 | Koshak | | |
| 5,655,061 A | 8/1997 | Tse et al. | | |
| 5,737,455 A | 4/1998 | Harrington et al. | | |
| 5,754,706 A | 5/1998 | Schweid et al. | | |
| 5,825,399 A | 10/1998 | Orlicki et al. | | |
| 5,828,379 A * | 10/1998 | Cok | ................. | 345/581 |
| 5,872,902 A | 2/1999 | Kuchkuda et al. | | |
| 5,926,406 A | 7/1999 | Tucker et al. | | |
| 5,972,440 A * | 10/1999 | Erland | ................. | 428/33 |
| 6,057,855 A | 5/2000 | Barkans | | |
| 6,129,457 A | 10/2000 | Thompson, Jr. et al. | | |
| 6,285,348 B1 | 9/2001 | Lewis | | |
| 6,417,853 B1 * | 7/2002 | Squires et al. | ................. | 345/473 |
| 6,553,140 B1 * | 4/2003 | Soupliotis et al. | ................. | 382/167 |

OTHER PUBLICATIONS

Haeberli, et al. "The Accumulation Buffer: Hardware Support for High-Quality Rendering", Computer Graphics, vol. 24, No. 4, Aug. 1990 pp. 309-318.

Blinn, "Simulation of Wrinkled Surfaces", Computer Graphics, (Proc. Siggraph), vol. 12, No. 3, Aug. 1978, pp. 286-292.

Schlag, "Fast Embossing Effects on Raster Image Data", Graphics Gems IV, AP Professional, 1994, gem VIII.1, pp. 433-437.

* cited by examiner

*Primary Examiner*—Kanjibhai Patel
(74) *Attorney, Agent, or Firm*—Fish & Richardson P.C.

(57) ABSTRACT

Methods and apparatus, including computer program products, for creating an image-based effect from a digital matte. A digital matte is generated from an image. The digital matte is blurred. The blurred matte is shaped using a predefined shaping transformation. The shaped blurred matte is used to create the effect.

14 Claims, 4 Drawing Sheets

REDUCING ALIASING ARTIFACTS WHEN SHAPING A DIGITAL IMAGE

CROSS-REFERENCE TO RELATED APPLICATIONS

This application is a divisional (and claims the benefit of priority under 35 U.S.C. § 120) of U.S. application Ser. No. 09/514,748, filed Feb. 28, 2000 now U.S. Pat. No. 6,865, 301. The disclosure of the prior application is considered part of (and is incorporated by reference in) the disclosure of this application.

BACKGROUND

The present invention relates to digital image processing and techniques for reducing aliasing artifacts.

Digital image processing includes a wide variety of techniques for rendering artistic effects to a digital image, such as shading an image, blurring areas within the image, and embossing text. One image processing technique, referred to as table-shaping, replaces the pixel values of the digital image with new values defined by a lookup table. The values within the lookup table typically represent a transformation function (which may be thought of as, or defined by, a curve) such that the process shapes the digital image to achieve the desired artistic effect.

In the context of the Internet, such image-processing techniques are often applied to small images such as a small digital matte. A digital matte is a two-dimensional array having values representing either opacity or coverage. For example, small mattes are often used to represent coverage of a small typeface, such as 8–24 point fonts, or other small graphical elements such as push buttons. Because the image processing operation is often applied to a small number of pixels, the resultant image often exhibits aliasing artifacts such that objects within the image often have jagged edges.

SUMMARY OF THE INVENTION

In general, the invention provides a method and apparatus, including a computer program apparatus, implementing techniques for reducing aliasing artifacts when shaping a digital image. In one aspect, the techniques are directed to a method for processing the digital image. According to the method, a set of subpixel data values is generated as function of the pixel data of the digital image, and each of the subpixel data values is mapped to a new subpixel data value. The original pixel data of the digital image is adjusted according to the new subpixel data values, thereby shaping the digital image.

In another aspect, the techniques are directed to a computer program that generates one or more sets of subpixel data values as a function of the pixel data of a digital image. Each subpixel data value has an integer component and a fractional component and represents an interpolation between the corresponding pixel and one or more adjacent pixels. In one implementation, to generate the sets of subpixel data values, the computer program creates a plurality of two-dimensional arrays of subpixel values by bi-linearly interpolating between adjacent pixels within the selected area of the image. The computer program maps the subpixel data values to new subpixel data values and modifies the pixel data of the digital image according to the new subpixel data values. In one configuration, the computer program applies additional lookup tables or image processing operations, such as image shading, directly to the subpixel data values before adjusting the pixel data of the image.

One advantage of applying table-shaping operations and other image processing operations to subpixel data is that the operations are applied at a higher resolution than if applied directly to the original pixel data, thereby reducing aliasing artifacts that might otherwise be introduced. The details of one or more embodiments of the invention are set forth in the accompanying drawings and the description below. Other features and advantages of the invention will become apparent from the description, the drawings, and the claims.

DETAILED DESCRIPTION

Figure 1:
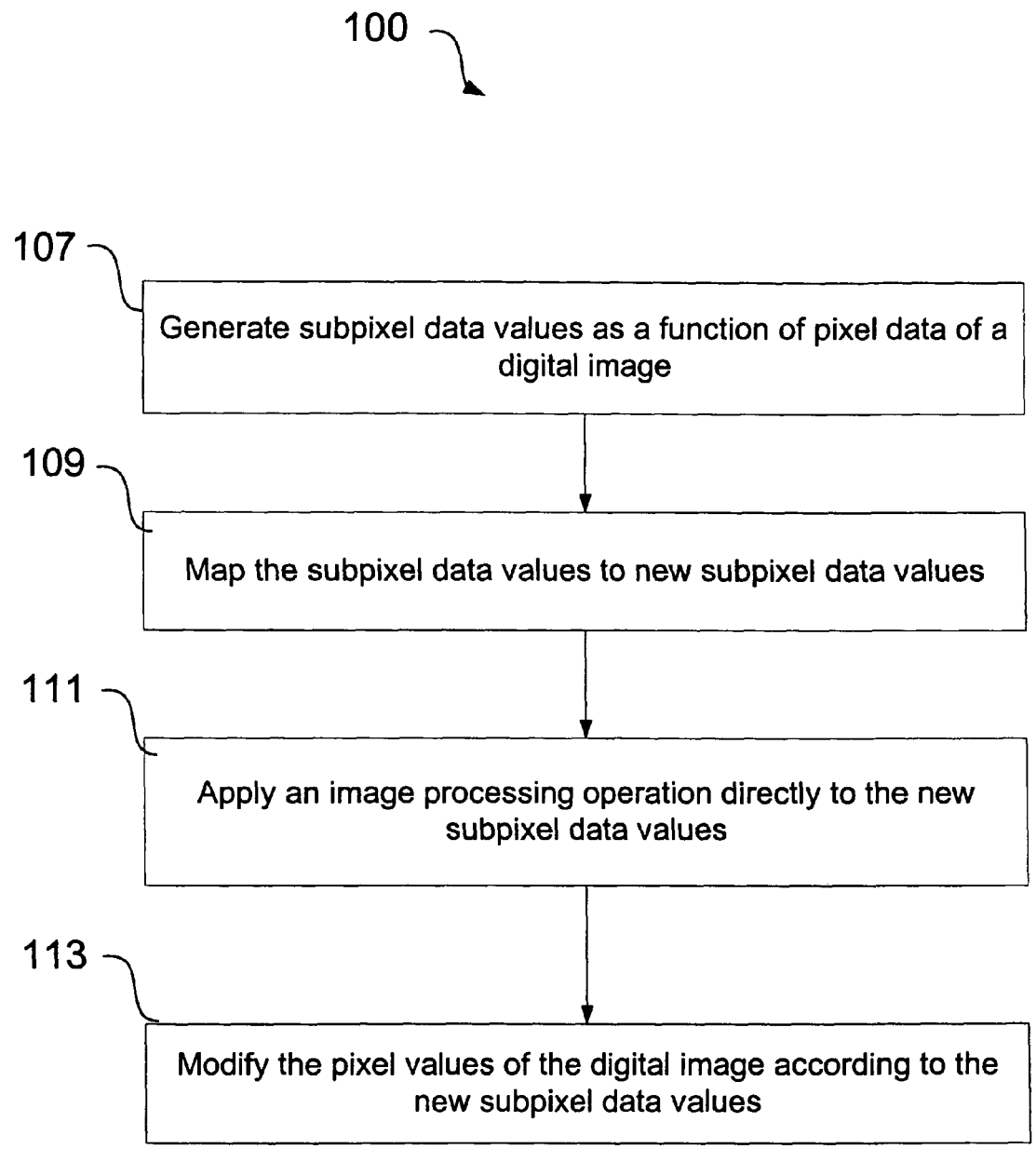
FIG. 1 is a flowchart illustrating one embodiment of a process by which a computer program reduces aliasing artifacts in digital image data produced by an image processing operation.

FIG. 1 is a flow chart illustrating one embodiment of a process 100 suitable for implementation in a computer program application to reduce aliasing artifacts that often result when shaping a digital image, such as a small digital matte. Generally speaking, image-processing tools often truncate pixel data by throwing away fractional pixel data generated by an image processing operation. For example, when applying a blur, a halo, a glow or a shadow to a digital image such as a digital matte, an image-processing tool typically truncates each pixel to an integer value. In one implementation, contrary to these approaches, process 100 retains the fractional pixel data produced by prior image processing operations.

In order to shape the digital image, process 100 generates one or more sets of "subpixel" data values, also referred to as a subpixel patch, as a function of the pixel data within a region of interest of the digital image (step 107). Each subpixel value is a high-resolution value having an integer component and a fractional component and is calculated as a function of the values of neighboring pixels, such as by interpolating between a given pixel and adjacent pixels. Process 100 need not generate a set of subpixel data values for each pixel. For example, in one implementation, process 100 checks the values of the adjacent pixels before calculating the subpixel data values. If a pixel has a value equal to, or within a predetermined amount from, data values of adjacent pixels then process 100 does not generate subpixel data values for the pixel. In addition, the sets of subpixel values can be sequentially generated and discarded and need not exist concurrently. In one implementation, process 100 creates a plurality of two-dimensional arrays of subpixel data values by bi-linearly interpolating between adjacent pixels for the region of interest within the image.

After generating the subpixel data values, the computer maps each subpixel data value to a new subpixel data value (step 109). For example, in one implementation, each set of subpixel data values is processed using a lookup table. During this table-shaping process, process 100 replaces the subpixel data values with new values from a lookup table. The values within the lookup table typically represent a user-defined transformation function such that the table-shaping process shapes the original subpixel data values in order to achieve a desired artistic effect, such as the creation of variations in color, opacity or shading, within the image. When table-shaping the subpixel data values, process 100 uses a lookup table where the elements within the table have an integer component and a fractional component, thereby more accurately representing the desired transformation function than if truncated integer values were used. In one implementation, each element of the lookup table stores two bytes where the high order byte represents the integer component and the low order byte represents the fractional component.

After processing each set of subpixel data values with one or more lookup tables, process 100 optionally applies one or more additional image processing operations directly to the subpixel data values (step 111). For example, as explained in detail below, a shading operation can be applied to the subpixel data values. One advantage of applying the operation to the subpixel data is that the image processing operation is applied at a higher resolution than if applied directly to the original pixel data, thereby reducing aliasing artifacts that might otherwise be introduced by the operation.

Next, process 100 updates each original pixel data value according to the corresponding new subpixel data values (step 113). The original pixel values updated as a function of the subpixel data values, such as an average or a weighted average of the subpixel data values.

Figure 2:
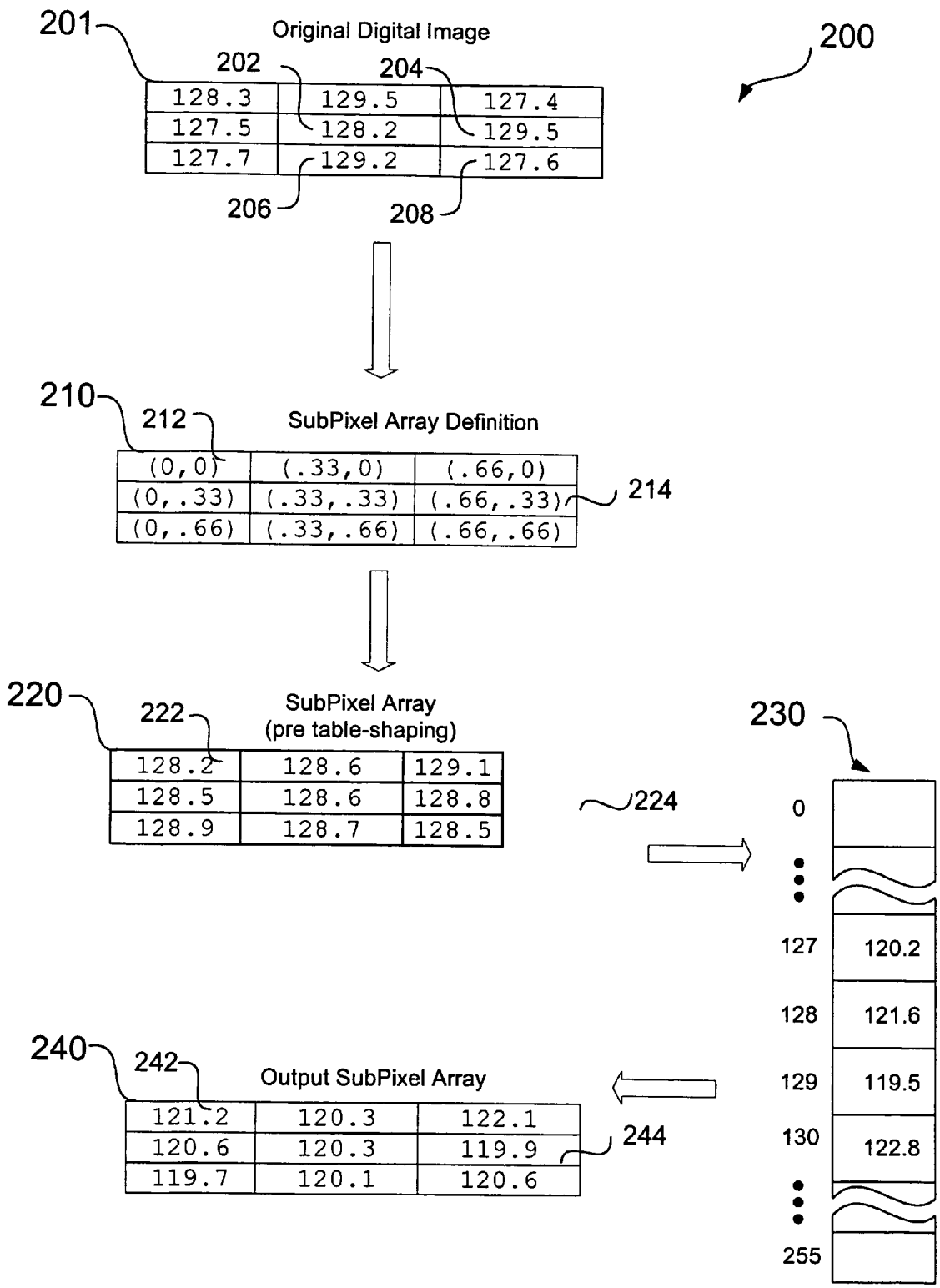
FIG. 2 further illustrates the process of FIG. 1 and presents an embodiment in which the computer program creates a two-dimensional array of subpixel data values by bi-linearly interpolating between adjacent pixels.

Generally speaking, the subpixel values are derived by applying an interpolation or other curve fitting method to the value of a set of neighboring pixels, such as four adjacent pixels, eight adjacent pixels, or even a larger number of neighboring pixels. FIG. 2 illustrates one implementation in which a process 200 creates a 3×3 array of subpixel values by bi-linearly interpolating between four neighboring pixels. In the following example, the pixel data of digital image 201 is described as having an integer component and a fractional component. Using fractional component is not necessary, but it improves the accuracy of the anti-aliasing techniques over using truncated pixel data.

Process 200 table-shapes digital image 201 using lookup table 230. More specifically, process 200 updates pixel 202 of digital image 201 by bi-linearly interpolating between pixels 202, 204, 206 and 208. In this implementation, in order to increase speed and reduce computation requirements, process 200 does not consider the other pixels adjacent to pixel 202. Other neighboring pixels, however, can be considered in generating subpixel values.

For pixel 202, process 200 generates an array of subpixel values for pixel 202 according to subpixel array 210, which defines how one implementation of a subpixel array can be calculated. In this implementation, process 200 calculates each value in the subpixel array 210 based on two corresponding interpolation parameters (A, B). More specifically, process 200 uses A to calculate a first linear interpolation value between the current pixel 202 and the adjacent pixel to the right, i.e., pixel 204. Thus, the first linear interpolation value $V_1$ can be calculated as follows:

$$V_1 = Pixel_{202} + (Pixel_{204} - Pixel_{202}) * A$$

Next, process 200 uses A to calculate a second linear interpolation value between a pixel below the current pixel, i.e., pixel 206, and its adjacent pixel to the right, i.e., pixel 208. Thus, the second linear interpolation value $V_2$ can be calculated as follows:

$$V_2 = Pixel_{206} + (Pixel_{208} - Pixel_{206}) * A$$

Finally, process 200 uses B to calculate the final subpixel data value by linearly interpolating between the first and second linear interpolation values. Thus, for pixel 202, any subpixel value S within array 210 can be calculated as follows:

$$S = V_1 + (V_2 - V_1) * B$$

Subpixel array 220 represents a subpixel array for pixel 202 as calculated using bi-linear interpolation according to the above equations.

Lookup table 230 illustrates a lookup table suitable for shaping the subpixel values of subpixel array 220. The integer component of each subpixel value of array 220 is used as an index to the lookup table 230. The fractional value of each subpixel value is used to interpolate between elements of the table 230. For example, in calculating a replacement value for element 222, the integer value 128 is used as an index into table 230 and the fractional value of 0.2 is used to interpolate between the values within element 128 and element 129 of table 230. Subpixel array 240 represents subpixel array 220 after processing each element according to lookup table 230. For example, element 242 of subpixel array 240 is 120.2, which equals 121.6+(119.5−121.6)*0.2. Similarly, element 244 of subpixel array 240 is 119.9, which equals 121.6+(119.5−121.6)*0.8.

After calculating all of the subpixel values within array 240, process 200 averages all of the elements of subpixel array 240 and updates pixel 202 of digital image 201. For example, in the illustrated implementation process 200 updates element 202 from 128.2 to 120.5, which is the average of all of the elements within subpixel array 240. This process is repeated for each pixel of digital image 201, thereby reducing the aliasing artifacts introduced by the image processing operation that generated digital image 201.

Figure 3:
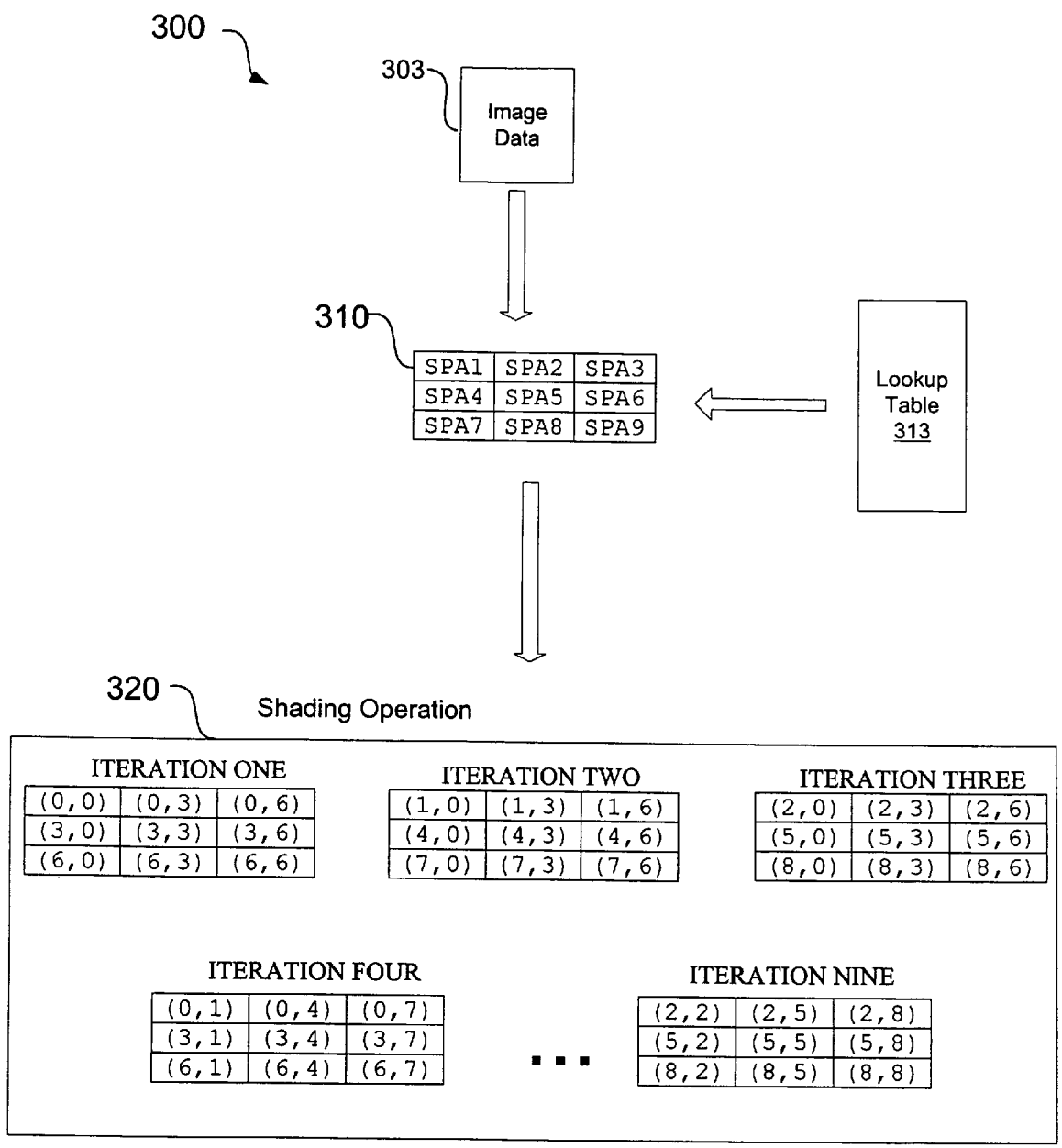
FIG. 3 further illustrates the process of FIG. 1 and presents an embodiment in which the computer program creates a plurality of subpixel arrays and applies an image processing operation directly to the subpixel arrays.

FIG. 3 illustrates a process 300 that creates a plurality of subpixel arrays and applies an image processing operation to the pixel data of the subpixel arrays prior to updating the original pixel data.

For example, conventional image shading operations often apply two 3×3 gradient filters to a given pixel and its neighbors in order to calculate a surface normal. According to the invention, process 300 calculates nine subpixel arrays for the current pixel and its neighbors. Process 300 groups the nine subpixel arrays as illustrated by array 310, which include subpixels arrays SPA1 through SPA9, and applies the gradient filters directly to the subpixel arrays.

More specifically, each subpixel array SPA1 through SPA9 is calculated in a manner similar to array 240 (FIG. 2), as described above, including processing each subpixel element with lookup table 313. Process 300 can implement a "scrolling window" technique to avoid redundant calculations; process 300 stores interpolation data from previous subpixel calculations and uses the data for subsequent calculations.

After generating the plurality of subpixel arrays SPA1 through SPA9, process 300 applies iteratively the image shading operation 320 directly to the subpixel arrays. In this manner, the image processing operation is applied directly to fractional values, thereby reducing aliasing artifacts that might otherwise occur.

In the illustrated implementation, process 300 applies shading operation 320 to the nine subpixel arrays SPA1 through SPA9 in nine iterations. In each iteration, process 300 selects a single subpixel value from each of the nine subpixel arrays and applies the 3×3 gradient filters to the nine selected subpixel values. For example, in iteration one process 300 selects the upper left subpixel value of each array SPA1 through SPA9 and applies the gradient filters to generate a first shaded pixel value. In iteration two, process 300 selects the next fractional pixel value in the horizontal direction within each of the nine subpixel arrays and applies the shading operation to the newly selected subpixel values to generate a second shaded pixel value. Process 300 repeats this processes nine times until all of the subpixel values have been processed and nine shaded pixel values have been generated. Process 300 averages the nine shaded pixel values and updates the current pixel data of image 303. In one implementation process 300 calculates a weighted average of the nine shaded pixel values. Process 300 repeats the process for all image data 303 until the shading operation is complete.

Various embodiments have been described of a method and system that reduce aliasing artifacts within output digital image data produced by an image processing operation. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an operating environment of a computer including at least one programmable processor coupled to receive data and instructions from, and to transmit data and instructions to, a data storage system, at least one input device, and at least one output device.

Figure 4:
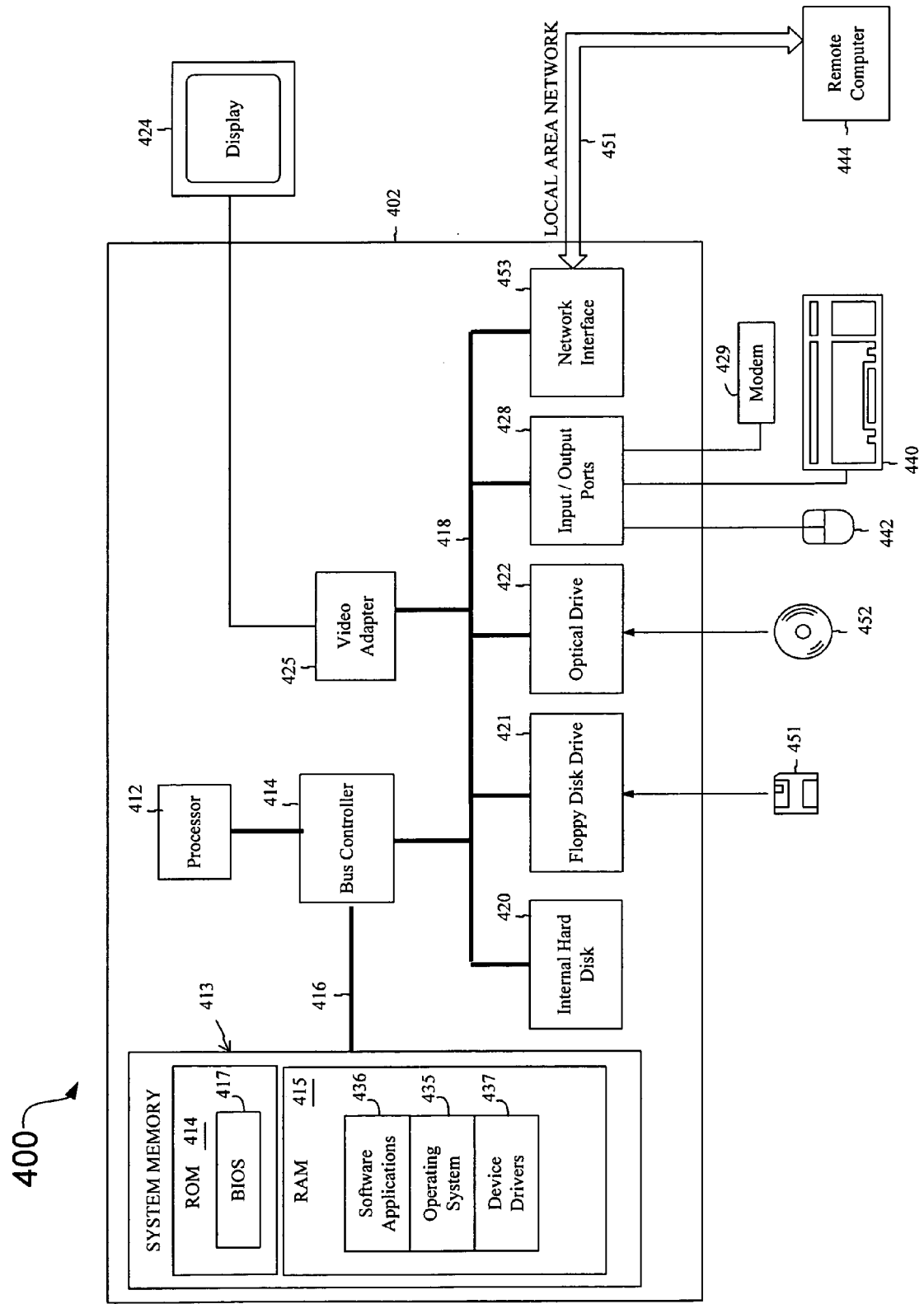
FIG. 4 is a block diagram illustrating a programmable processing system suitable for implementing and performing the apparatus and methods of the invention.

An example of one such type of computer is shown in FIG. 4, which shows a block diagram of a programmable processing system (system) 400 suitable for implementing or performing the apparatus or methods of the invention. As shown in FIG. 4, the system 400 includes a processor 412 that in one implementation belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. System 400 represents any server, personal computer, laptop or even a battery-powered, pocket-sized, mobile computer known as a hand-held PC or personal digital assistant (PDA).

System 400 includes system memory 413 (including read only memory (ROM) 414 and random access memory (RAM) 415, which is connected to the processor 412 by a system data/address bus 416. ROM 414 represents any device that is primarily read-only including electrically erasable programmable read-only memory (EEPROM), flash memory, etc. RAM 415 represents any random access memory such as Synchronous Dynamic Random Access Memory.

Within the system 400, input/output bus 418 is connected to the data/address bus 416 via bus controller 419. In one implementation, input/output bus 418 is implemented as a standard Peripheral Component Interconnect (PCI) bus. The bus controller 419 examines all signals from the processor 412 to route the signals to the appropriate bus. Signals between the processor 412 and the system memory 413 are merely passed through the bus controller 419. However, signals from the processor 412 intended for devices other than system memory 413 are routed onto the input/output bus 418.

Various devices are connected to the input/output bus 418 including hard disk drive 420, floppy drive 421 that is used to read floppy disk 451, and optical drive 422, such as a CD-ROM drive that is used to read an optical disk 452. The video display 424 or other kind of display device is connected to the input/output bus 418 via a video adapter 425.

Users enter commands and information into the system 400 by using a keyboard 440 and/or pointing device, such as a mouse 442, which are connected to bus 418 via input/output ports 428. Other types of pointing devices (not shown in FIG. 4) include track pads, track balls, joysticks, data gloves, head trackers, and other devices suitable for positioning a cursor on the video display 424.

As shown in FIG. 4, the system 400 also includes a modem 429. Although illustrated in FIG. 4 as external to the system 400, those of ordinary skill in the art will quickly recognize that the modem 429 may also be internal to the system 400. The modem 429 is typically used to communicate over wide area networks (not shown), such as the global Internet. Modem 429 may be connected to a network using either a wired or wireless connection.

Software applications 436 and data are typically stored via one of the memory storage devices, which may include the hard disk 420, floppy disk 451, CD-ROM 452 and are copied to RAM 415 for execution. In one implementation, however, software applications 436 are stored in ROM 414 and are copied to RAM 415 for execution or are executed directly from ROM 414.

In general, the operating system 435 executes software applications 436 and carries out instructions issued by the user. For example, when the user wants to load a software application 436, the operating system 435 interprets the instruction and causes the processor 412 to load software application 436 into RAM 415 from either the hard disk 420 or the optical disk 452. Once one of the software applications 436 is loaded into the RAM 415, it can be used by the processor 412. In case of large software applications 436, processor 412 loads various portions of program modules into RAM 415 as needed.

The Basic Input/Output System (BIOS) 417 for the system 400 is stored in ROM 414 and is loaded into RAM 415 upon booting. Those skilled in the art will recognize that the BIOS 417 is a set of basic executable routines that have conventionally helped to transfer information between the computing resources within the system 400. Operating system 435 or other software applications 436 use these low-level service routines. In one implementation system 400 includes a registry (not shown) that is a system database that holds configuration information for system 400. For example, the Windows® operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

What is claimed is:

1. A method of creating an image-based effect from a digital matte, comprising:
   generating a digital matte from an image;
   blurring the digital matte, where blurring the digital matte includes generating high resolution values for the pixels of the blurred matte, high resolution values being values having a fractional component;
   shaping the blurred matte using a predefined shaping transformation; and
   using the shaped blurred matte to create the image-based effect.

2. The method of claim 1, wherein:
   shaping the blurred matte comprises transforming a region of interest of the matte pixels from original values to new values by:
      forming a subpixel patch for each matte pixel to create subpixels for each matte pixel;
      applying the shaping transformation to each of the subpixels created for each matte pixel; and
      calculating a new value for each matte pixel in the region from the transformed values of the corresponding subpixels.

3. The method of claim 2, wherein:
   using the matte comprises applying an image processing operating to the subpixels of the region after applying the shaping transformation and before calculating new values for matte pixels.

4. The method of claim 3, wherein:
   the high-resolution values are an 8.8 result for each pixel of the blurred matte;
   the subpixel patch a particular pixel is a 3×3 patch composed of bilinearly interpolated values calculated from values of pixels neighboring the particular pixel; and
   the new values are calculated as an unweighted average of the values of the corresponding subpixels after the shaping transformation has been applied.

5. A method of creating an image-based effect from a digital matte, comprising:
   generating a digital matte from an image;
   blurring the digital matte, where blurring the digital matte includes generating high resolution values for the pixels of the blurred matte, high resolution values being values having a fractional component;
   shaping the blurred matte using a predefined shaping transformation; and
   using the shaped blurred matte to create the image-based effect;
   wherein,
   the predefined shaping transformation is implemented by a lookup table; and
   the act of shaping the blurred matte is performed by applying the lookup table to the blurred matte.

6. The method of claim 1, wherein:
   the predefined shaping transformation is defined by a user interacting with a graphical user interface to specify a curve defining the transformation.

7. The method of claim 1, wherein:
   the digital matte is small.

8. A computer program product stored on a computer readable medium for creating an image-based effect from a digital matte, comprising instructions operable to cause a programmable processor to:
   generate a digital matte from an image;
   blur the digital matte where the instructions to blur the digital matte include instructions to generate high resolution values for the pixels of the blurred matte, high resolution values being values having a fractional component;
   shape the blurred matte using a predefined shaping transformation; and
   use the shaped blurred matte to create the image-based effect.

9. The computer program product of claim 8, wherein:
   the instructions to shape the blurred matte comprise instructions to transform a region of interest of the matte pixels from original values to new values by:
      forming a subpixel patch for each matte pixel to create subpixels for each matte pixel;
      applying the shaping transformation to each of the subpixels created for each matte pixel; and
      calculating a new value for each matte pixel in the region from the transformed values of the corresponding subpixels.

10. The computer program product of claim 9, wherein:
    the instructions to use the matte comprise instructions to apply an image processing operating to the subpixels of the region after applying the shaping transformation and before calculating new values for matte pixels.

11. The computer program product of claim 10, wherein:
    the high-resolution values are an 8.8 result for each pixel of the blurred matte;
    the subpixel patch a particular pixel is a 3×3 patch composed of bilinearly interpolated values calculated from values of pixels neighboring the particular pixel; and
    the new values are calculated as an unweighted average of the values of the corresponding subpixels after the shaping transformation has been applied.

12. A computer program product for creating an image-based effect from a digital matte, comprising instructions operable to cause a programmable processor to:
    generate a digital matte from an image;
    blur the digital matte where the instructions to blur the digital matte include instructions to generate high resolution values for the pixels of the blurred matte, high resolution values being values having a fractional component;
    shape the blurred matte using a predefined shaping transformation; and
    use the shaped blurred matte to create the image-based effect;
    wherein,
    the predefined shaping transformation is implemented by a lookup table; and
    the act of shaping the blurred matte is performed by applying the lookup table to the blurred matte.

13. The computer program product of claim 8, wherein:
    the predefined shaping transformation is defined by a user interacting with a graphical user interface to specify a curve defining the transformation.

14. The computer program product of claim 8, wherein:
    the digital matte is small.

* * * * *

UNITED STATES PATENT AND TRADEMARK OFFICE
CERTIFICATE OF CORRECTION

PATENT NO. : 7,082,223 B1
APPLICATION NO. : 10/622852
DATED : July 25, 2006
INVENTOR(S) : Jerry Harris It is certified that error appears in the above-identified patent and that said Letters Patent is hereby corrected as shown below:

Column 7, line 32, delete "operating" and insert --operation--;
      line 38, after the first occurrence of "patch", insert --for--;
Column 8, line 30, delete "operating" and insert --operation--;
      line 36, after the first occurrence of "patch", insert --for--.

Signed and Sealed this

Seventh Day of November, 2006

JON W. DUDAS
*Director of the United States Patent and Trademark Office*